United States Patent [19]

MacChesney et al.

[11] Patent Number: 4,616,901
[45] Date of Patent: Oct. 14, 1986

[54] DOPED OPTICAL FIBER

[75] Inventors: John B. MacChesney, Lebanon; Jay R. Simpson, Fanwood; Kenneth L. Walker, New Providence, all of N.J.

[73] Assignee: AT&T Bell Laboratories, Murray Hill, N.J.

[21] Appl. No.: 527,970

[22] Filed: Aug. 31, 1983

Related U.S. Application Data

[63] Continuation-in-part of Ser. No. 367,091, Apr. 9, 1982, abandoned.

[51] Int. Cl.⁴ .................................................. G02B 6/00
[52] U.S. Cl. .............................. 350/96.34; 350/96.29; 65/3.11; 65/60.8
[58] Field of Search .............. 350/96.29, 96.30, 96.31, 350/96.34; 65/3.11, 3.12, 3.41, 60.8

[56] References Cited

U.S. PATENT DOCUMENTS

| | | | |
|---|---|---|---|
| 3,966,446 | 6/1976 | Miller | 350/96.29 |
| 4,110,002 | 8/1978 | Klein et al. | 350/96.34 |
| 4,189,208 | 2/1980 | Grodkiewicz et al. | 65/3.11 |
| 4,194,807 | 3/1980 | Gleimeroth | 65/3.11 |
| 4,425,146 | 1/1984 | Izawa et al. | 65/60.8 |
| 4,426,129 | 1/1984 | Matsumura et al. | 65/3.11 |
| 4,445,754 | 5/1984 | Beales et al. | 65/3.11 |
| 4,451,116 | 5/1984 | Pinnow et al. | 350/96.34 |

OTHER PUBLICATIONS

"Chemical Vapor Deposition of Polycrystalline Al$_2$O$_3$"; Wong et al., *J. of the Amer. Ceramic Soc.*, vol. 53, No. 11; Nov. 1970; pp. 617-621.

"Vapor Growth of Al$_2$O$_3$ Bicrystals"; Parker et al., *J. of the Amer. Ceramic Soc.*, vol. 53, No. 11, Nov. 1970, pp. 583-585.

*Primary Examiner*—William L. Sikes
*Assistant Examiner*—Robert E. Wise
*Attorney, Agent, or Firm*—Eugen E. Pacher

[57] ABSTRACT

Optical fibers doped with nonglass forming refractory oxides, such as alumina and zirconia, are disclosed. Devitrification is retarded by adding an additional glass forming component, such as P$_2$O$_5$, and by rapidly quenching the heated glass. Aluminum and zirconium-containing precursor vapors are formed by passing halide gas over heated aluminum or zirconium wire.

10 Claims, 4 Drawing Figures

DOPED OPTICAL FIBER

CROSS REFERENCE TO RELATED APPLICATION

This application is a continuation-in-part of our copending application, Ser. No. 367,091, filed Apr. 9, 1982 and now abandoned.

BACKGROUND OF THE INVENTION

1. Field of the Invention

This invention involves optical fibers based upon the silica glass system in which either the core, the cladding, or both, have an index of refraction different frm that of pure silica as a result of the addition of an appropriate dopant. The system employed in the disclosed optical fibers includes nonglass forming constituents, such as alumina or zirconia, as dopants.

2. Disclosures of Interest

Over the past decade the suggestion of Kao and Hockham (Proceedings of IEE, Vol. 113, No. 7, July 1966, p. 1151) that silica would constitute an appropriate transmission medium for low loss optical fibers has been widely realized. Optical fibers are now routinely fabricated on a commercial basis with losses less than 1 dB/km in at least part of the optical region of the spectrum, generally extending from 0.7 to 1.7 microns. The fibers comprise a core and a cladding, with the cladding having an index of refraction lower, at least in part, than that of an index of refraction associated with the core. Both multi-mode fibers and single-mode fibers are routinely fabricated using various design parameters, such as appropriate gradations in index of refraction to obtain desirable characteristics, such as high bandwidth.

Dopants which are used include germania, an index raising dopant, which is the principal and most widely used dopant, as well as other minor dopants, such as phosphorus, and other index raising dopant, and fluorine and boron, index lowering dopants. In addition, boron and phosphorus are used to improve processing characteristics, such as those associated with sintering. Recently, boron has been less widely used because of its infrared absorption band which appears in the spectral range of interest. Where long wavelength transmission is of interest, boron is usually replaced with fluorine, which, like boron, lowers the index of refraction of silica glass systems, but which has a longer wavelength infrared absorption band.

Germania, currently the principal dopant used in optical fibers to increase the index of refraction of silica, has been widely used over the past decade, almost to the exclusion of all other index raising dopants; this, despite the fact that germania has significant economic and technical drawbacks, including high cost, scarcity, a tendency to only partially react to form particulate material, and relatively high volatility with a resultant tendency to "burnoff" during high temperature processing. Furthermore, acceptable incorporation of germania in silica requires a high concentration of oxygen in the reaction atmosphere (many times stoichiometry) which in many processes results in an extended deposition region and a resultant deleterious taper in the deposit. Additionally, in order to remove trace amount of hydroxyl impurities, it is advantageous to have a high chlorine-to-oxygen ratio in the reaction environment; however, this tends to further degrade the efficiency of germania incorporation. Despite these drawbacks, germania remains the preferred index raising dopant, and essentially the only one in commercial use, primarily because no acceptable alternate dopant has been effectively developed.

The literature is replete with suggestions of various dopants for use in the fabrication of optical fibers. Generally, these disclosures are in the form of a listing of a large number of possible dopants with the suggestion that combinations of the dopants may also be used. (See, for example, U.S. Pat. No. 4,157,790, column 5, lines 1-6. "Many suitable materials have been used as a dopant alone or in combination with each other to increase the refractive index of fused silica. These include, but are not limited to titanium oxide, tantalum oxide, aluminum oxide, lanthanum oxide, phosphorus oxide and germanium oxide.") The use of alumina as a dopant has been specifically investigated (S. Kobayashi et al, *Electronics Letters*, Vol. 10, No. 20, p. 410, 1974). Such work, however, has generally involved low concentrations of alumina dopant. The use of higher concentrations of alumina generally results in devitrification (J. F. MacDowell and G. H. Beall, *Journal of the American Ceramics Society*, Vol. 52, p. 17, January 1969), and hence is discouraged.

Definitions

By "glass precursor material" is meant herein material formed by a process comprising (a) reacting at least one glass-forming precursor material (e.g., $SiCl_4$) with oxidizing material (e.g., $O_2$) and (b) depositing a product of the reaction (e.g., particulate $SiO_2$) on a substrate. The glass precursor material can be transformed into (unitary) glass by heating, a process often referred to as sintering. "Devitrification" is the appearance of regions of crystalline structure in a glass body.

SUMMARY OF THE INVENTION

This invention is an optical fiber doped, at least in part, with at least one nonglass forming refractory oxide which is substantially stable relative to its halide vapor species at typical deposition temperatures used in fiber fabrication. Furthermore, the refractory oxide is substantially stable relative to its suboxides at subsequent processing temperatures, such as for example at collapse temperatures used in MCVD. Exemplary nonglass forming refractory oxides appropriate for the practice of this invention include alumina and zirconia. In the practice of this invention alumina has been incorporated in silica fibers at dopant levels even greater than 5, 7 or 10 mole percent without deleterious devitrification. Such high concentrations of nonglass forming dopants may be obtained by either incorporating a third glass forming dopant, such as $P_2O_5$, to retard devitrification, or by using a fabrication process which quenches the doped silica to form the glass state. Processes for fiber fabrication which may quench the doped silica in the glass state include the MCVD process where deposited particulate material is sintered to a clear glass by means of a passing hot zone. This is to be compared with various forms of the flame hydrolysis process which are applied to fiber fabrication to yield a porous particulate body which is then sintered to a clear glass over relatively long periods of time. In the various fiber fabrication processes which utilize hydrolysis, sintering occurs over temperature-time periods long compared to the temperature-time period over which devitrification occurs, thereby allowing the doped silica to devitrify. The temperature-time devitrification periods relevant for materials discussed here may be deleteriously shortened by the fact that alumina, for example, is not a glass former, and hence tends to devitrify relatively rapidly. Consequently, short temperature-time periods for sintering may become important.

In at least the case of alumina or zirconia, a doped halide precursor vapor may be conveniently formed by passing high purity halide vapor, such as chlorine, over high purity aluminum or zirconia wire advantageously heated in an appropriate vessel. The halide precursor vapor may be diluted, for example, by helium, to provide a mixture dew point high enough so that the mixture may be delivered without condensation. In an exemplary embodiment the mixture was delivered, along with other precursor vapors such as silicon tetrachloride and oxygen, to an MCVD fabrication apparatus where appropriate deposition, and subsequent fiber fabrication, occurred.

DETAILED DESCRIPTION

Figure 1:
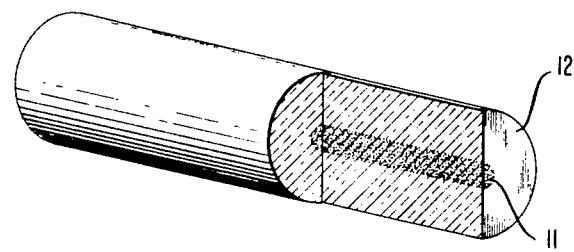
FIG. 1 is a schematic representation of the inventive fiber.

The invention is a communications grade optical fiber (loss less than 2.5 dB/km over at least a portion of the optical region of the spectrum) comprising silica (generally greater than 80 weight percent) doped with a nonglass forming refractory oxide such as $Al_2O_3$ or $ZrO_2$. The specific design of the fiber is determined by the requirement of the practitioner, but will usually include a cladding region of lower index of refraction and a central core region of higher index of refraction. The size of the various regions, as well as their relative index of refraction values and distributions or gradations, are determined by the particular application. As in the prior art, dopant oxides are used to alter the index of refraction of the silica-based fiber with a view toward obtaining requisite index of refraction values and/or gradations. Oxides used in this invention are substantially stable relative to their halide vapor species at temperatures necessary to form and deposit the oxides during fiber fabrication. Simultaneously, these oxides are substantially stable relative to their suboxides at subsequent processing temperatures, such as for example, collapse temperatures in MCVD.

The significance of this invention and the importance of the dopant's stability relative to its halide vapor species, as well as to its suboxides, may be understood by considering the various fabrication processes as well as the chemistry used to transform these vapor reactants to doped silica glass.

There are two major fiber fabrication processes currently in commercial practice. They are the MCVD process (U.S. Pat. No. 4,217,027) developed by the Bell System and the Corning hydrolysis process (U.S. Pat. No. Re. 28,029). The Corning process involves the formation of silica and/or doped silica particles using a hydrolysis burner (see, U.S. Pat. Nos. 2,272,342 and 2,326,059), and the subsequent deposition of these particles on an appropriate mandrel to obtain a porous tubular body which is subsequently sintered to a clear glass tube from which the fiber is drawn.

The MCVD process involves flowing appropriate glass precursor reactants through a glass tube which is traversed by an appropriate hot zone. In commercial embodiments, the hot zone serves the dual purpose of (a) stimulating reaction of the glass precursor vapors to form glass particulate material which generally deposits downstream of the hot zone, and (b) simultaneously sintering previously deposited particulate material to a unitary glass layer. In commercial practice, subsequent to deposition, the tube is collapsed to a rod from which the fiber is drawn.

For the purposes of this invention, a distinction of significance between the Corning hydrolysis process and the Bell MCVD process is the time-temperature period necessary for sintering. Since the Corning process deals with a macroscopic porous particulate body which must be sintered, the temperature-time period for sintering is relatively long. In the MCVD process, however, sintering generally occurs layer by layer and is effected by means of the passing hot zone which traverses at rates generally greater than 1 or 2 cm per minute. This results in a relatively short temperature-time period for sintering. The significance of this distinction arises because of the tendency of the nonglass forming refractory oxides to crystallize if given sufficient time, at sufficiently elevated temperatures, to equilibrate. In the MCVD process where the temperature-time period for sintering is short, the nonglass forming refractory oxide is essentially quenched in the glass state. In the Corning hydrolysis process, however, where the temperature-time period for sintering is relatively long, equilibration may result in devitrification of the nonglass former to a crystal. This proclivity of the oxide to devitrify is exacerbated by the fact that it is a nonglass former and tends to devitrify if given the thermodynamic opportunity. Inclusion of at least one additional glass former retards the tendency to devitrify.

Consideration of the chemistry which occurs during glass formation gives the practitioner an appreciation for the significance of the dopant's stability relative to its halide vapor species, as well as relative to its suboxides. In generic form, the relevant reaction is

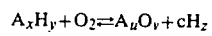

$$A_xH_y + O_2 \rightleftharpoons A_uO_v + cH_z$$

where "A" is silicon or an appropriate dopant, such as phosphorus, germanium, aluminum, zirconium, etc., "H" is an appropriate halide, such as, for example, chlorine and "c" is a constant. Table I presents order of magnitude estimates of the ratios of equilibrium partial pressures of the halides to the initial partial pressures of the reactants. This represents the fraction of halide which remains unreacted at equilibrium. In Table I, equilibria are compared at typical deposition temperatures for the MCVD process, e.g., 1800 degrees Kelvin. The Table shows that only one in $10^6$ parts of silicon tetrachloride remains unreacted in the MCVD process, consistent with measured observations that silicon tetrachloride is completely reacted in MCVD. Germania tetrachloride, on the other hand, remains 70 percent unreacted. This, too, is consistent with observations which indicate that germanium oxide is difficult to incorporate into the silica glass during fiber fabrication.

Furthermore, germania incorporation becomes very sensitive to temperature resulting in a layer structure deleterious to the resultant bandwidth of the optical fiber. Table I shows, however, that zirconia tetrachloride and aluminum trichloride, behaving much like phosphorus oxychloride, are essentially entirely reacted during MCVD chemistry (less than 5 parts in $10^5$ unreacted). The results of Table I led one to believe, as in fact applicants have now shown, that alumina and zirconia may be easily incorporated into silica glass.

TABLE I

| Reaction | Equilibrium Between Chloride and Oxide of MCVD Reactants at 1800° K. $\frac{p^{MCl_4} \text{(Equilibrium Partial Pressure)}}{p^{o\,MCl_4} \text{(Initial Partial Pressure)}}$ |
|---|---|
| $SiCl_4 + O_2 \rightleftharpoons SiO_2 + 2Cl_2$ | $1 \times 10^{-6}$ |
| $GeCl_4 + O_2 \rightleftharpoons GeO_2 + 2Cl_2$ | $7 \times 10^{-1}$ |
| $2POCl_3 + 3/2\,O_2 \rightleftharpoons P_2O_5 + 3Cl_2$ | $4 \times 10^{-5}$ |
| $2AlCl_3 + 3/2\,O_2 \rightleftharpoons Al_2O_3 + 3Cl_2$ | $3 \times 10^{-5}$ |
| $ZrCl_4 + O_2 \rightleftharpoons ZrO_2 + 2Cl_2$ | $3 \times 10^{-9}$ |

The stability of the oxide to its suboxide species during subsequent processing at elevated temperatures is a measure of the tendency of the oxide to vaporize as a suboxide, for example, during the collapse step in MCVD. In Table II, the equilibrium partial pressures of particular suboxides are compared for a number of oxides used in fiber fabrication. As can be seen from the Table, the partial pressure of germanium oxide is high. Hence, the equilibrium between $GeO_2$ and $GeO$ at high temperatures, such as those encountered in the MCVD collapse step, favor the vaporization of $GeO_2$ as $GeO$, a reaction referred to as "burnoff," and resulting in an index dip in the resultant fiber. This index dip is believed to be a cause of bandwidth loss. Table II, however, shows that both aluminum oxide and zirconium oxide have very little tendency to vaporize as suboxides, (suboxide partial pressure less than $5 \times 10^{-9}$) and hence will show little, if any "burnoff" tendencies.

TABLE II

| Reaction | Equilibrium Partial Pressure of the Suboxide ($P_{O_2} = 1.0$ atm.) 2300° K. | Oxide Activity (x) |
|---|---|---|
| $SiO_2 \rightleftharpoons SiO + \frac{1}{2}O_2$ | $1 \times 10^{-5}$ atm. | 0.9 |
| $GeO_2 \rightleftharpoons GeO + \frac{1}{2}O_2$ | $1 \times 10^{1}$ | 0.1 |
| $P_2O_5 \rightleftharpoons 2PO + 3/2\,C_2$ | $5 \times 10^{-9}$ | 0.05 |
| $P_2O_5 \rightleftharpoons P_2O_3 + O_2$ | $1 \times 10^{-1}$ | 0.05 |
| $P_2O_5 \rightleftharpoons 2PO + \frac{1}{2}O_2$ | $2 \times 10^{-6}$ | 0.05 |
| $Al_2O_3 \rightleftharpoons Al_2O + O_2$ | $7 \times 10^{-17}$ | 0.1 |
| $Al_2O_3 \rightleftharpoons 2AlO + \frac{1}{2}O_2$ | $4 \times 10^{-9}$ | 0.1 |
| $Al_2O_3 \rightleftharpoons Al_2O_2 + \frac{1}{2}O_2$ | $2 \times 10^{-15}$ | 0.1 |
| $ZrO_2 \rightleftharpoons ZrO + \frac{1}{2}O_2$ | $2 \times 10^{-14}$ | 0.1 |
| $B_2O_3 \rightleftharpoons B_2O_2 + 3/2\,O_2$ | $5 \times 10^{-6}$ | 0.1 |
| $B_2O_3 \rightleftharpoons 2BO + \frac{1}{2}O_2$ | $5 \times 10^{-5}$ | 0.1 |

The FIGURES will be helpful in discussing the particular embodiment described in the Example. In FIG. 1 a fiber fabricated according to the teachings of this invention is shown. In this Example, 11 is the fiber core comprising silica doped with appropriate nonglass forming refractory oxides, including alumina and/or zirconia, and 12 is the fiber cladding which may be pure silica or silica doped with dopants disclosed here, or common to those skilled in the art.

Proper formation of dopant precursor vapor yields superior fiber transmission characteristics. For example, while alumina trichloride is available as a powder over which oxygen may be flowed to yield alumina trichloride vapor in oxygen, the aluminum trichloride powder is relatively impure. While silicon and germania trichloride have been used in conjunction with oxygen carrier gas to yield appropriate vapor, the high vapor pressure of these constituents results in the separation of contaminants which are left behind, due to their low vapor pressure. However, the low vapor pressure of aluminum trichloride does not allow for this inherent purification phenomenon. Trimethylalumina, which has a higher vapor pressure has been considered but results in deleterious contamination because of hydroxyl formation, not to mention its tendency to explode upon contact with oxygen. Additionally, aluminum trichloride tends to dimerize with contaminants further exacerbating the contaminant problem.

To alleviate contamination, and unlike previous fiber fabrication chemistry, which involved the direct formation of a reactant vapor, such as $SiCl_4$, the present process involves, in a sense, a two-step chemistry. First, formation of appropriate reactant by passing chlorine over aluminum, and then reaction with oxygen to form an appropriate silica-based glass (see, for example, K. Nassau et al, *Journal of the American Ceramics Society*, Vol. 58, p. 461, (1975), H. S. Parker and C. A. Harding, *Journal of the American Ceramics Society*, Vol. 53, p. 583, November 1970, and P. Wong and M. Robinson, *Journal of the American Ceramics Society*, Vol. 53, p. 617 November 1970).

Figure 2:
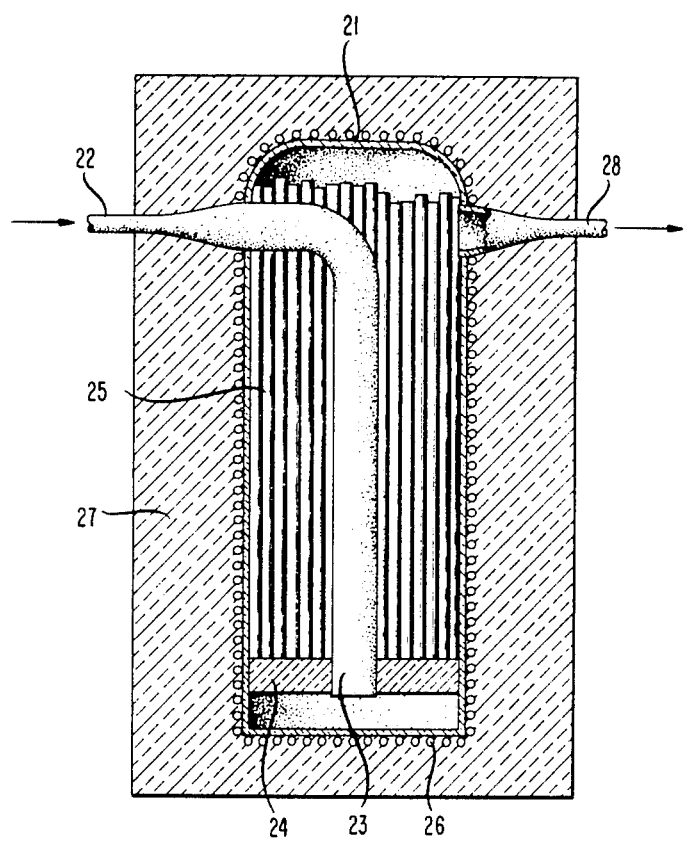
FIG. 2 is a schematic representation of a reactor oven which may be used to form doped precursor vapor in the practice of this invention.

FIG. 2 is a reactor oven which may be used to form an aluminum or zirconium halide precursor reactant for delivery, for example to an MCVD apparatus. In the FIGURE, 21 is a Pyrex vessel. Chlorine, as well as any diluents which may be used, such as helium, enter the reactor oven through 22, pass through a tube, 23, through fritted glass, 24, and over aluminum or zirconium wire, 25. The vessel may be heated with tape, 26, or in a furnace, and insulated with vermiculite insulation, 27. The resultant aluminum chloride, and any diluent which may be used, exit through 28 and are then transmitted to a reactant injector which is heated to prevent condensation.

Figure 3:
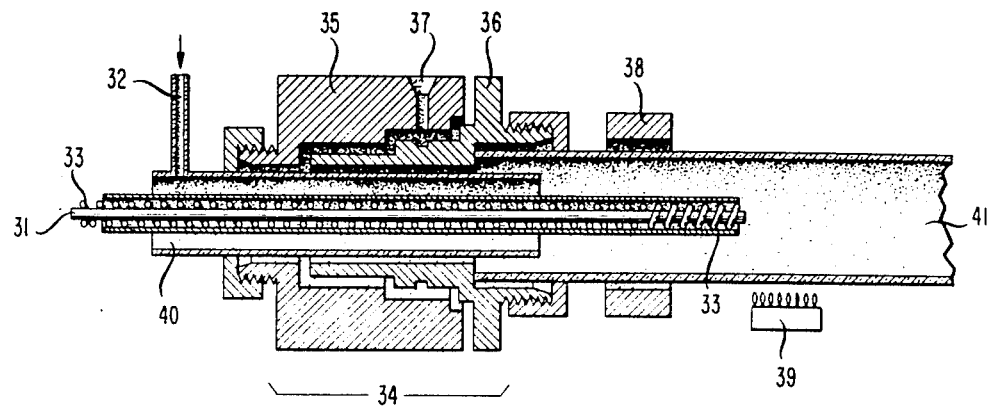
FIG. 3 is a schematic representation of an exemplary injector which may be used to deliver the reactant precursor vapor to a deposition apparatus without condensation.

The reactant injector is shown in FIG. 3 where the aluminum halide and associated diluents enter through 31. Other reactants such as silicon tetrachloride, $POCl_3$ and oxygen enter through 32. The two different groups of reactants are shown separated to prevent premature reaction. Heating tape, 33, surrounds the injector through which the aluminum halide is passed to prevent condensation. 34 is a rotating seal comprising a stationary part, 35, and a rotating part, 36. Purge gas is passed through the stationary part at 37 to prevent contamination of the reactant gas with ambient air. 38 is the downstream lathe head stock and chucks used in the MCVD process, and 39 is an appropriate ribbon burner. 40 is an exemplary 16 millimeter O.D. tube used to feed reactant gas to the reaction tube, and 41 is the MCVD substrate tube, in the particular embodiment discussed below, a silicon tube of 19 mm × 25 mm dimension.

A similar approach can be used with other metallic fiber dopants whose halides have a relatively low vapor pressure, such as, for instance, Nb, Ta, Ga, In, Sn, Sb, Bi, the 4f rare earths, and the alkaline earths Be, Mg, Ca, Sn, Sr, Cd, and Ba. Since the reactions between these metals and chlorine tend to be thermodynamically favored, and tend to proceed at reasonably low temperatures, the metal-halides can be formed, e.g., in a reactor of the type shown in FIG. 2, by contacting metal objects, e.g., wires or granules, with the halogen gas. The thus formed metal-halide precursor can then be conveyed to the deposition tube, substantially as discussed above, where the precursor is caused to react with an oxidizing medium in the usual manner, to thereby produce a metal-doped glassy deposit. Typically, the halide vapor is transported in a stream of carrier gas, e.g., He, through a heated delivery system (as exemplified in part in FIG. 3) to the deposition tube. However, those halides having a particularly low vapor pressure, e.g., rare earth halides, are advantageously formed near, or even within, the deposition tube. In either case, the deposit is formed on the inside wall of the tube, consolidated, the thus formed preform collapsed, and a fiber drawn from the solid rod preform.

Figure 4:
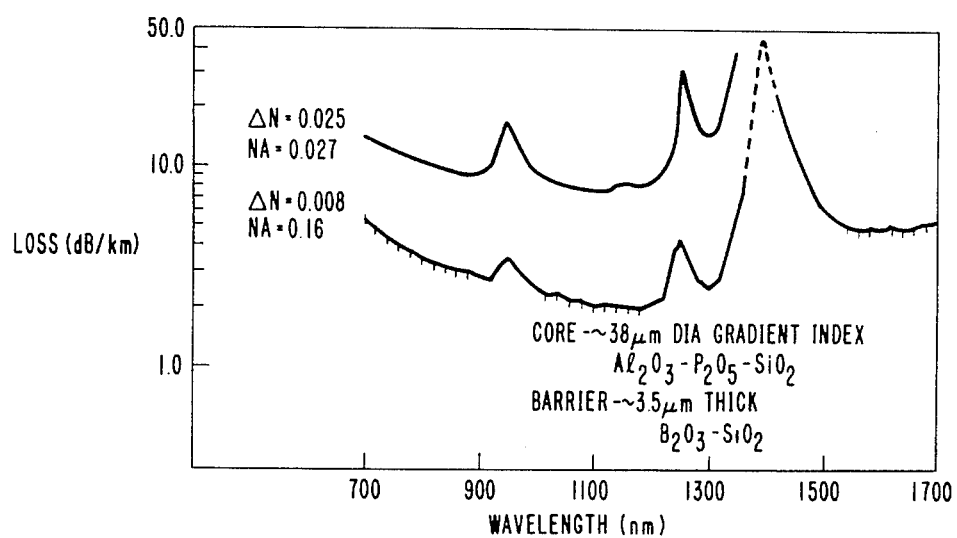
FIG. 4 is a graphical representation of the loss values obtained in a fiber fabricated according to the teachings of this invention.

FIG. 4 is a loss diagram for exemplary fibers fabricated according to the teachings of this invention.

EXAMPLE

Optical fiber preforms were made using a standard MCVD lathe and delivery system with the addition of an $AlCl_3$ generator (FIG. 2) and a hot reactant injector (FIG. 3). Pure $AlCl_3$ was generated by passing high purity chlorine (Airco research grade) over Marz grade aluminum wire (5–9's containing transition metals at less than 1 ppm) heated to 300 degrees Celsius in a Pyrex vessel (21 in FIG. 2). The chlorine flow was controlled from 5 to 100 cc/min. to regulate the amount of $AlCl_3$ generated and was diluted by 300 cc/min. of helium to provide a mixture dew point high enough to be delivered by the injection tube heated to 200 degrees Celsius. The hot injection system (FIG. 3), designed around a rotating TEFLON (basically polytetrafluoroethylene) seal provided the heated line necessary to deliver the $AlCl_3$—He mixture to a region near the upstream turnaround point of the deposition torch. We have found it advantageous to deliver the $AlCl_3$ separately from $POCl_3$, $SiCl_4$ and $O_2$ to avoid clogging of the lines where the chlorides mix and to prevent a particulate deposit upstream. When formed, this has a tendency to detach during deposition causing an inhomogeneous deposit downstream.

Deposition was carried out in waveguide grade 16×19 mm silica tubes using a single water-cooled torch for deposition and collapse. Deposit conditions are outlined in Table III.

TABLE III

Deposition Conditions
Substrate Tube 16 × 19 mm Hereaus TO8
Atlanta Type Oxy-Hydrogen Torch
Torch Traverse 18 cm/min.

| BARRIER | 5 passes | deposit temp. 1760° C. |
|---|---|---|
| | $SiCl_4$ | 1.3 grams/min. |
| | $BCl_3$ | 10.0 cc/min. |
| | Total $C_2$ | 2150 cc/min. |
| | He | 200 cc/min. |
| CORE | 10 passes | deposit temp. 1700–1740° C. |
| | $SiCl_4$ | 1.3 grams/min. |
| | $POCl_3$ | 0.0065 grams/min. |
| | Total $O_2$ | 2250 cc/min. |

TABLE III-continued

Deposition Conditions
Substrate Tube 16 × 19 mm Hereaus TO8
Atlanta Type Oxy-Hydrogen Torch
Torch Traverse 18 cm/min.

| $AlCl_3$ generator | |
|---|---|
| Temperature 150° C.; | |
| Chlorine 10–50 cc/min; | |
| 5 cc/min. increment/pass; | |
| Helium 300 cc/min | |

Before each deposition run, reaction of the aluminum wire (heated to 300 degrees Celsius) was initiated by passing chlorine and helium over it until a visible amount of $AlCl_3$ could be condensed inside the substrate tube. The condensed $AlCl_3$ was then sublimed while helium continued to purge the generator. We believe this practice prepared the surface of the aluminum wire in the generator to allow controlled delivery of $AlCl_3$ when required. Deposition of a $B_2O_3$—$SiO_2$ barrier and a $Al_2O_3$—$P_2O_5$—$SiO_2$ core proceeded much the same as usual. During collapse, however, the low viscosity of the core composition required that considerable back pressure be applied to ensure a circular core.

The attenuation of two $Al_2O_3$—$P_2O_5$—$SiO_2$ core fibers are presented in FIG. 4. These fibers had numerical apertures of 0.16 and 0.27 and minimum losses of 2 dB/km and 8 dB/km at 1.15 μm respectively. We attribute these losses, lower than previously reported work, to the purity of the $AlCl_3$ generated by the reaction/injection method and the reduced tendency of the ternary $Al_2O_3$—$P_2O_5$—$SiO_2$ glass system to devitrify. The higher the doping level the greater the tendency to devitrify, and consequently greater quenching and/or addition of more third component, such as $P_2O_5$ is necessary. Applicants find that the inclusion of phosphorus suppresses the tendency of the alumina deposited silica glass to devitrify. Although the inclusion of phosphorus tends to lower the viscosity of the resultant melt and hence would tend to indicate more likely devitrification, applicants find less likelihood of devitrification. The $P_2O_5$—$Al_2O_3$—$SiO_2$ system contains the phase ($AlPO_4$) which is an isomorph of silica. The incorporation of Al in the $AlPO_4$ groups effectively diminishes the tendency to form mullite crystals which are thought to be responsible for devitrification.

Reduction of $OH^-$ concentrations to levels even below those typically observed in $GeO_2$—$SiO_2$ fibers is possible using this invention. As revealed by Table I the oxide of aluminum is more stable at deposition temperatures than $GeO_2$. Thus the reaction will even occur at increased $Cl_2$ levels leading to the possibility of adding more $Cl_2$ during deposition, or operation at reduced $O_2$ levels to yield very low OH fibers. This can potentially lead to yet lower levels of hydroxyl concentrations which are controlled by the reaction:

$$H_2O + Cl_2 \rightleftharpoons 2HCl + \tfrac{1}{2}O_2.$$

As revealed by Tables I and II the thermodynamic characteristics of zirconium oxide are even more favorable than those of aluminum oxide. We have made fibers using $ZrCl_4$ as the reactant, and the tendency to devitrify is greater than with alumina.

What is claimed is:

1. An optical fiber comprising at least 80% by weight silica, at least some of the silica being doped silica, characterized in that
the doped silica comprises more than 5 mole percent alumina or zirconia and also comprises an effective amount of at least one phosphorus oxide for preventing devitrification of the doped silica during fiber manufacture.

2. A method of forming an optical fiber, the method comprising
  (a) forming a metal-halide-containing vapor by passing a halogen gas over at least one solid metal object, the metal object consisting essentially of at least one of the metals selected from the group consisting of Al, Zr, Nb, Ta, Ga, In, Sn, Sb, Bi, the 4f rare earths (atomic numbers 57–71), and the alkaline earths Be, Mg, Ca, Zn, Sr, Cd, and Ba,
  (b) reacting the metal-halide-containing vapor to form a preform, and
  (c) drawing an optical fiber from the preform.

3. The method of claim 2, wherein the metal object is a wire or a granule.

4. The method of claim 2, wherein the metal object is a wire consisting essentially of Al or Zr.

5. An optical fiber containing everywhere at least 80% by weight silica, the fiber produced by a process comprising forming a body by a process comprising
  (a) depositing glass precursor material comprising doped silica on a substrate,
  (b) heating the glass precursor material for a time sufficient to produce unitary glass from the glass precursor material, the time also chosen such that substantially no devitrification of the glass formed from the glass precursor material results from the heating, and
  (c) drawing the optical fiber from the body,
characterized in that
the doped silica comprises silica doped with more than 5 mole percent alumina or zirconia.

6. The fiber of claim 5, wherein the fabrication process is MCVD.

7. The fiber of claim 6, the fiber comprising a core comprising silica doped with more than 5 mole percent alumina.

8. The fiber of claim 7, wherein the core further comprises $P_2O_5$.

9. The fiber of claim 5, the fiber comprising silica further doped with at least one glass forming dopant.

10. The fiber of claim 9, wherein the glass forming further dopant is $P_2O_5$.

* * * * *